Oct. 23, 1934.    G. LUFKIN    1,977,967
GLASS GATHERING MACHINERY
Filed Feb. 26, 1930    6 Sheets-Sheet 1

Fig.1

Inventor
Garland Lufkin
By J. F. Rule,
Attorney

Oct. 23, 1934.                G. LUFKIN                1,977,967
                      GLASS GATHERING MACHINERY
                       Filed Feb. 26, 1930        6 Sheets-Sheet 2

Inventor
Garland Lufkin
By J. F. Rule
               Attorney

Oct. 23, 1934.   G. LUFKIN   1,977,967
GLASS GATHERING MACHINERY
Filed Feb. 26, 1930    6 Sheets-Sheet 3

Fig. 3.

Inventor
Garland Lufkin
By J. F. Rule.
Attorney

Oct. 23, 1934.　　　　G. LUFKIN　　　　1,977,967
GLASS GATHERING MACHINERY
Filed Feb. 26, 1930　　　6 Sheets-Sheet 6

Inventor
Garland Lufkin
By
J. F. Rule
Attorney

Patented Oct. 23, 1934

1,977,967

UNITED STATES PATENT OFFICE

1,977,967

GLASS GATHERING MACHINERY

Garland Lufkin, Toledo, Ohio, assignor to Owens-Illinois Glass Company, a corporation of Ohio Application February 26, 1930, Serial No. 431,421

20 Claims. (Cl. 49—5)

My invention relates to a method and apparatus for gathering and forming molten glass wherein the gravity flow from an orifice in communication with a source of molten glass to a blank mold, is assisted by the action of a vacuum within the mold or by a mechanical impulse acting within the glass, toward the orifice, or by a combination of both.

Among the objects of my invention are the following:

To provide means for sealing the nose of the blank firmly against the orifice, to make the suctional action within the blank effective throughout the entire column of the blank mold bore and the glass within the orifice, so that the atmospheric pressure will act on the surface of the molten glass within the supply chamber, to force it through the orifice and into the mold;

To make effective the suctional action within the mold by providing a seal for the nose of the blank mold other than the seal made by the molten glass itself, as in other forms of gathering apparatus. This avoids local over-heating of the nose of the blank, preventing sticking of the glass thereto, and insuring a more uniform distribution of heat in the mold and the parison;

To provide means for severing the glass between the nose of the blank mold and the orifice such that the edges of the bore of the mold do not serve as part of the shearing means, thus reducing the amount of wear of these edges;

To provide a continuous and unobstructed passage for the molten glass from the source, through the orifice and into the blank mold, so that the filling of the blank may be rapidly accomplished;

To provide means for compacting the glass within the mold before withdrawing the mold from the orifice, in order to insure a compact and solid parison;

To provide means for constricting the column of glass intervening between the blank mold and the orifice after the mold is withdrawn from the orifice and to sever the intervening column at the point of maximum constriction so that the cross sectional area of molten glass chilled by contact with the severing means will be a minimum;

To provide means for retracting into the source of molten glass the severed protrusion from the orifice after the shearing operation and to maintain it in its retracted position until a subsequent gather of glass is made, in order that the portion chilled by contact with the severing means may be re-heated;

To provide means for raising and lowering the blank mold to the gathering position in contact with the orifice and away from said orifice to the shearing position after the gather has been made;

To provide means for rapidly actuating the shears after the withdrawal of the blank from the gathering position, irrespective of the speed at which consecutive gathers are made, in order to insure a proper cut-off of the glass intervening between the blank mold and the orifice.

Other objects of my invention will appear hereinafter.

In the accompanying drawings which make a part of this specification:

Figs. 9, 9A and 9B show diagrammatically, in the same section as Fig. 2, the steps in making a gather of molten glass.

Referring to the drawings, the forehearth 1 connected to the face of the furnace 48 through a trough 3, is supported by blocks 28 on frame 4. The level of the molten glass 5 in the forehearth and its rate of flow thereto, is controlled by the position of the regulating plug 6, vertically suspended and movable in the trough 3 by the hanger bar 7. An opening 8 provides for the introduction of a burner to control the temperature of the molten glass and 9 is a chimney opening for the escape of the gases of combustion.

Affixed to the forward end face of the forehearth and forming the end of the glass containing chamber, is a spout 10 provided with a projection on its under side through which is an orifice 13. The outer surfaces of the spout are surrounded with an insulating medium 19 enclosed in the metal housing 18. The said spout, insulation and housing form a unit supported in its proper relation to the forehearth by the cantilevered hanger bracket 17, said bracket being rigidly affixed to vertical standards of the frame 4.

The spout 10 is provided with a cover 20 having a hole 97 in vertical alignment with orifice 13 and a refractory plunger 11 extending through said opening and projecting downwardly into the molten glass. The plunger 11 is firmly held at its upper end by clamp 98 of arm 12 adjustably mounted in a carrier 61. The adjustment of arm 12 in the carrier 61 is in a direction longitudinal of said carrier and is accomplished by loosening a locking screw 63 of said carrier in a slot 62 of said arm, to permit turning of an adjusting screw 64, the shouldered end of which is fitted into recess 99 of arm 12.

Figures 2, 13:
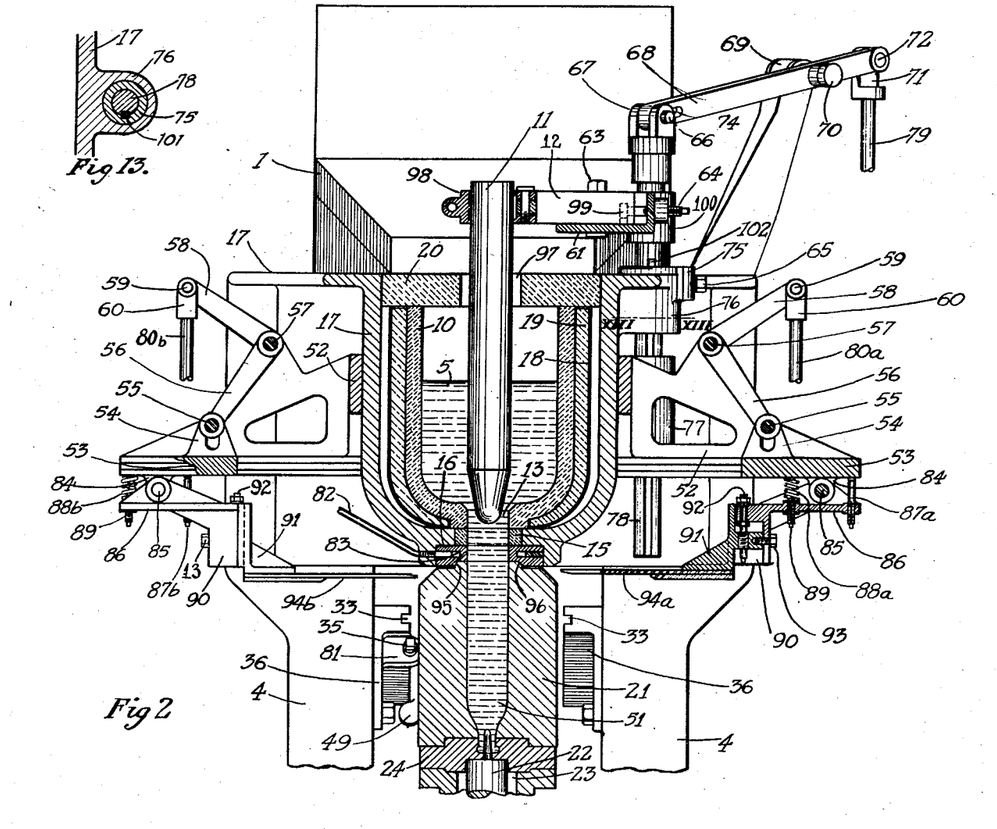
Fig. 2 is a section on the line II—II of Fig. 1.
Fig. 13 is a section through the plunger slide rod on line XIII—XIII of Fig. 2.

The carrier 61 has a hub 100 firmly attached to a vertically reciprocating rod 78 sliding in two guides, namely, a slideway 77 affixed to the hanger bracket 17, in which slideway the rod is free to rotate, and an adjusting bushing 75 rotatingly fitted into a hub 76 (see Fig. 13) formed on the bracket 17. The adjusting bushing 75 has a vertical key 101 projecting into keyway 102 of rod 78, thereby preventing relative rotation of said rod and bushing.

The carrier 61 with the rod 78 and bushing 75 are rotatively adjustable about the axis of the rod 78 and retained in adjusted position by means of a locking screw 65 which extends through a horizontally slotted hole in a downward projection of bushing 75 and clamps the bushing to the hub 76.

At the upper end of rod 78 is mounted a swivel yoke 67 having a pin 66 extending through a slotted hole 74 in one end of a lever 68, said lever being pivoted on pin 70 fixed to a vertical standard of frame 4 through the hub 69 extending therefrom. Vertical reciprocation of rod 78 is accomplished by rocking the lever 68, said lever being actuated by a rod 79 connected at its upper end to said lever through a yoke 71 and pin 72. The lower end of rod 79 is attached through a yoke 103 (Figs. 4 and 6) to a pin 104 at one end of a lever 105 fulcrumed on a pin 106 of a bracket 107. The other end of the lever 105 is provided with a pin 109 on which is mounted a roller 108 held against the face of a cam 110 by the tension of a spring 113 affixed at its upper end to said lever and at its lower end to base 114. Movement of rod 79 is accomplished by rotation of the cam 110 through a shaft 111 mounted in brackets 115 and 116 affixed to the base 114.

Figure 10:
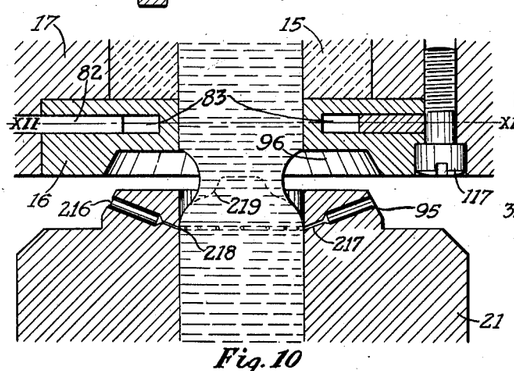
Fig. 10 is an enlarged section through the orifice of the feeder and the nose of a modified form of blank wherein vacuum relief holes are provided.
Figure 12:
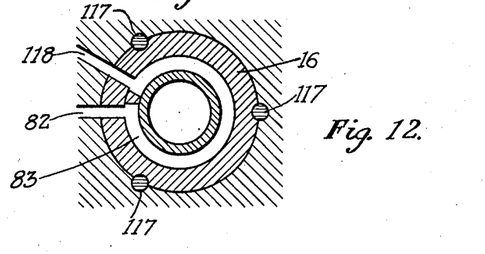
Fig. 12 is a section through the orifice supporting ring on line XII—XII of Fig. 10.

Directly under and in vertical alignment with orifice 13 of spout 10, is orifice ring 15 in contact with said orifice and supported by a water-cooled ring 16 fitted into a recess in the under side of hanger bracket 17, said supporting ring being firmly held in said recess by screws 117 (Figs. 10 and 12). Said supporting ring 16 has an annular passage 83 through which cooling water circulates from an inlet 82 of bracket 17 to outlet 118 of said bracket, said ring being provided with inlet and outlet ports in alignment with inlet 82 and outlet 118 respectively. The underneath surface of ring 16 has a recess 96 into which the projecting nose 95 of the blank mold 21 is tightly fitted during the gathering operation.

Shear blades $94^a$ and $94^b$ are positioned in a horizontal plane immediately beneath the bottom surfaces of bracket 17 and ring 16, sufficient clearance space being allowed for horizontal reciprocation of said shear blades toward each other across said surfaces of said bracket. The shear blades are affixed to adjusting brackets 91 vertically adjustable in slide blocks 90 by means of screws 92, said adjusting brackets being locked in proper adjustment by locking screws 93. Said slide blocks are integral parts of hangers 86 pivoted on pins 85 mounted in lugs 84 projecting from the hanger slides 53. Adjustment of the hangers 86 to maintain the blades $94^a$ and $94^b$ in proper shearing relation is obtained by means of adjusting screws $87^a$ and $87^b$, respectively, said screws being mounted in said hangers and thrusting against the under surfaces of slides 53, said thrust being opposed by the compression of springs $88^a$ and $88^b$, the compression being adjustable by means of spring screws 89. It is evident that the arrangement of adjusting screws $87^a$ and $87^b$ and springs $88^a$ and $88^b$ will permit a slight upward motion of shear blade $94^a$ and a slight downward motion of $94^b$ respectively, about the axes of pins 85 when the lower surface of blade $94^a$ comes into sliding contact with the upper surface of blade $94^b$ as said blades are horizontally reciprocated toward each other during the shearing operation.

Figure 3:
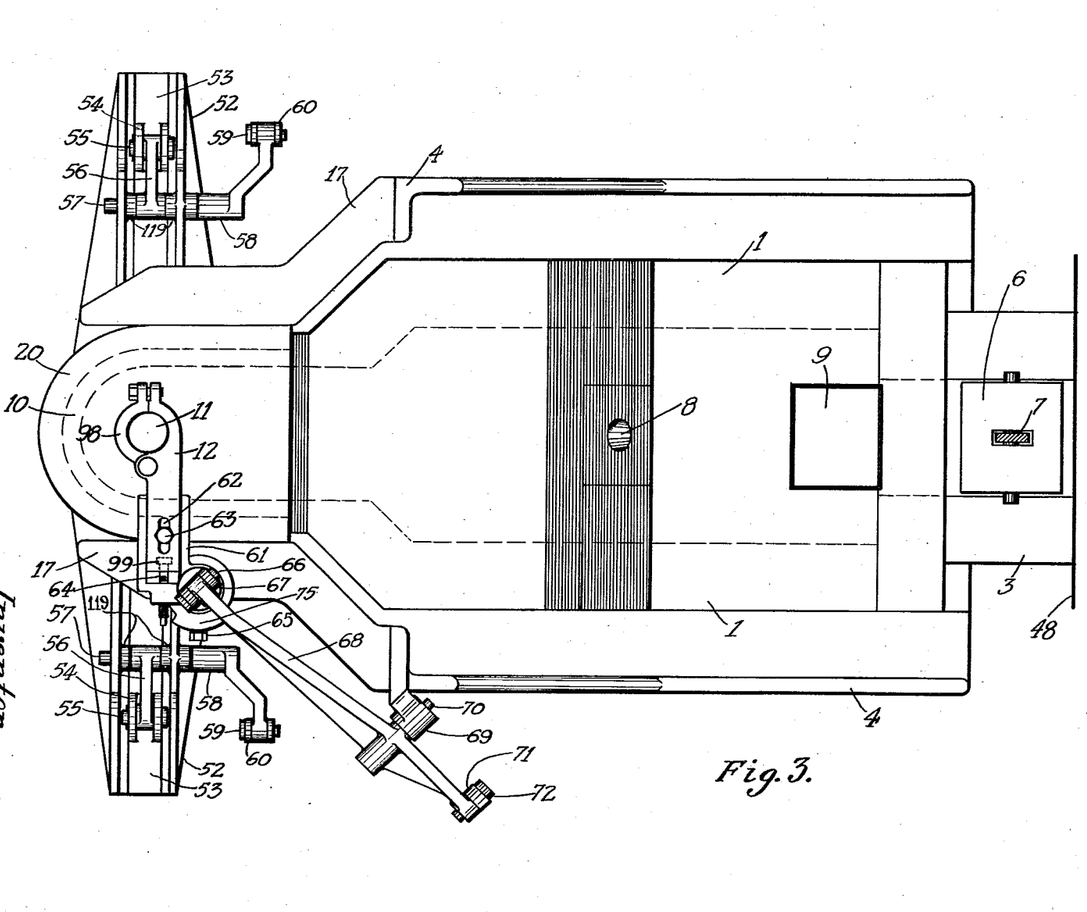
Fig. 3 is a plan view of the apparatus.

The hanger slides 53 are movable horizontally in slideways 52 rigidly affixed to the hanger bracket 17, said slides being reciprocated by lever arms 56 having pins 55 engaging vertically slotted holes in lugs 54 projecting upward from said slides. Said lever arms are swung by shafts 57 mounted in bearings 119 (see Fig. 3) of the slideways 52, said shafts being actuated by levers 58 attached thereto. The levers 58 are provided at their outer ends with pins 59 engaging the yokes 60 affixed to the upper ends of vertically reciprocating rods $80^a$ and $80^b$. The lower ends of said rods (see Figs. 4 and 5) have yokes 120 carrying pins 121 engaging the ends of levers $122^a$ and $122^b$. Lever $122^b$ is affixed to a hub $123^b$ swiveling on a pin $124^b$ carried in a bracket 125. A lever $126^b$ is also affixed to the hub $123^b$ and is connected at its outer end to a yoke $128^b$ by means of a pin $127^b$, said yoke being attached to one end of a horizontal rod 131 provided at its opposite extremity with a yoke $128^a$ engaging a pin $127^a$ carried in the end of a lever $126^a$, said lever being affixed to a hub $123^a$ swiveling on a pin $124^a$ mounted in projecting brackets 129 of a vertical slideway 130. It is evident that any rotation of the hub $123^a$ will impart a corresponding vertical movement to the rods $80^a$ and $80^b$. Hub $123^a$ is actuated by lever 132 affixed thereto, said lever being provided at its outer end with a slotted hole engaging a pin 133 mounted in projecting lugs 134 of the shear operating slide 135, which is vertically movable in slideway 130 affixed to base 114.

In order to obtain proper shearing action, it is desirable to have the shear blades operate rapidly regardless of the speed with which successive gathers of glass are made. This is accomplished by attaching to the top of the shear operating slide 135, the lower end of spiral spring 148, having its upper end connected to a lever 142 fulcrumed on a pin 140 carried in a bracket 149, said lever having at an intermediate point between the pin 140 and spring 148, a roller 147 in contact with a cam 146 firmly mounted on the shaft 111. The purpose of said cam is to apply at the proper time sufficient tension to the spring 148 to impart a rapid upward movement to the slide 135 and to remove the tension immediately thereafter.

The slide 135 also has a projecting lug 136 wherein is a horizontally slotted hole engaged by a pin 137 of a lever 138, said lever being fulcrumed on the pin 140 and having at an intermediate point, the upper end of a spiral spring 144 connected therewith, the lower end of said spring being connected to base 114. Said lever also carries at an intermediate point, a roller 143 in contact with a cam 145 firmly affixed on the shaft 111, the purpose of said cam being to hold the slide 135 in its downward position through lever 138 until the proper moment for the shearing operation arrives. The spring 144 is of such size and strength that the downward pull exerted thereby on slide 135 is less than the upward pull of the spring 148 on said slide when the spring 148 has its tension applied, but said downward pull of the lever 138 due to spring 144 is sufficient to rapidly retract said slide to its downward position when the tension on spring 148 is removed.

Figures 7, 14:
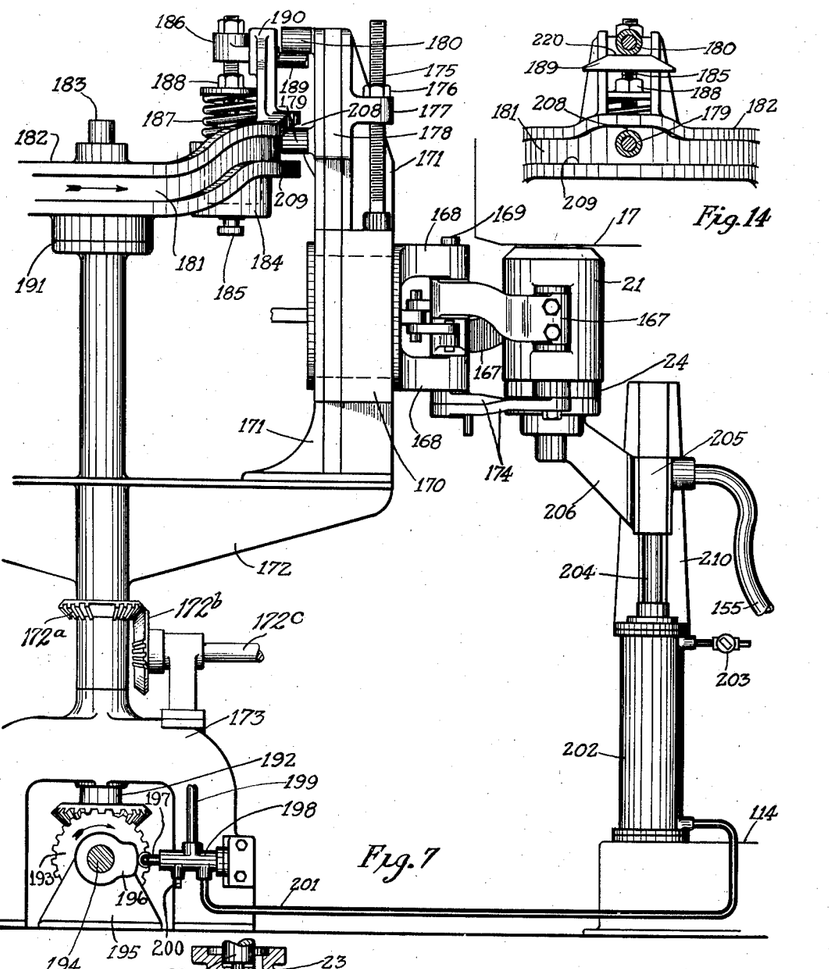
Fig. 7 is a side elevation of the mechanism for applying the blank mold to the orifice and withdrawing it therefrom.
Fig. 14 is a vertical section through the upper and lower rollers of the blank mold carriage lifting slide taken normal to the plane of Fig. 7 and looking toward the vertical shaft of the lifting cam.
Figure 8:
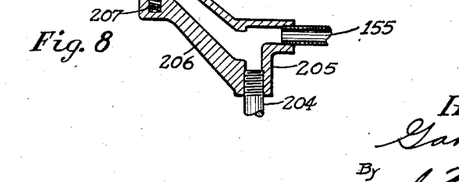
Fig. 8 is a section through the vacuum and plunger arm.

The blank mold 21 is supported in vertical alignment with the orifice 13, orifice ring 15 and supporting ring 16, by arms 167 (Fig. 7) attached to the blank mold, said arms being mounted on a pin 169 on a bracket 168 projecting from a carrier 170 slidable vertically in a slide bracket 171 attached to the mold carriage which comprises a frame 172 supported by a standard 173. The mold carriage is intermittently rotated on a vertical shaft 183 by means of a pair of mutilated gears 172ᵃ and 172ᵇ secured respectively to the hub of the frame 172 and a drive shaft 172ᶜ. The latter may be rotated continuously in synchronism with the cam shaft 111. The frame 172 preferably has mounted thereon a plurality of slide brackets 171, each supporting a carrier 170 and mold 21.

The pin 169 also carries arms 174 supporting a neck mold 24 concentrically recessed into the lower end of blank mold 21 and in firm contact therewith. Projecting upward from the sliding carrier 170 with its lower end rigidly attached thereto, is screw rod 175 provided with an adjustable hanger-nut 176, bearing on the upper surface of a lug 177 projecting from a roller slide 178, also vertically movable in the slide bracket 171.

A roller 179 on the slide 178 is engaged by the cam groove 181 of a lifting cam 182 mounted on the shaft 183 and supported by a thrust bearing 191 of the frame 172. Affixed to cam 182 is a housing 184 provided with a vertically sliding rod 185 having firmly affixed to its upper end a bracket 186 guided vertically by uprights 190 on the cam 182. Said bracket has at its outer end the double ended wedge 189 (Figs. 7 and 14) engaging a roller 180 mounted on the roller slide 178.

Upward pressure of the wedge 189 on said roller is obtained by the compression of a spring 187 mounted in a housing 184, said spring thrusting upwardly against an adjusting nut 188 on the rod 185. The cam groove 181 has a lower horizontal run and an upper horizontal section 209 provided with clearance at 208 to permit the lifting of roller 179 thereinto by the action of the spring 187. Between the two ends of the double wedge 189, there is provided a flat surface 220 on the upper side thereof whereon roller 180 rides in its maximum upward position at a constant level during the filling of blank mold 21.

The cam 182 rotates with and is mounted on the shaft 183 which extends downward through the bore of frame 172 and standard 173 and has firmly attached at its lower end a bevel gear 192 meshing with a bevel gear 193 mounted on and rotating with a shaft 194 carried in bearings 195, said shaft providing the drive for the mold positioning apparatus and being uniformly synchronized by means (not shown) with the cam shaft 111. The vacuum arm 206 carrying the plunger 22 and recessed on its upper face to fit the neck mold 24, is integral with a slide block 205 vertically movable in a slide bracket 210 attached to the air cylinder 202. The piston rod 204 of said air cylinder is attached to said slide block and is movable in alignment with the slide bracket 210. Air for operating the piston rod upward is admitted through a pipe 201 connected with a valve 198 mounted on the standard 173, said valve having a plunger 197 movable by a cam 196 affixed to the shaft 194, said plunger being held against the face of the cam by the action of a spring within the valve cylinder 198. The valve cylinder 198 also has a relief port 200 to allow the escape of air as the piston of rod 204 descends. The speed of raising and lowering the vacuum arm is adjustably controlled by an air relief valve 203 connected with the air cylinder 202.

The vacuum arm 206 has a vacuum passage 23 communicating with the blank mold 21 through clearance space provided between neck mold 24 and plunger 22. To said passage is connected a flexible vacuum hose 155 extending from a vacuum valve 153 (Figs. 4 and 5) mounted on the shear operating slideway 130. Said valve has connected therewith a pipe 154 leading to a source of vacuum, such as a vacuum pump, and also has a plunger 152 mounting at its outer end a roller 151 in contact with the surface of a valve operating cam 150 rotated by the cam shaft 111, the plunger being held against its cam by a spring contained within the valve cylinder 153.

Figure 11:
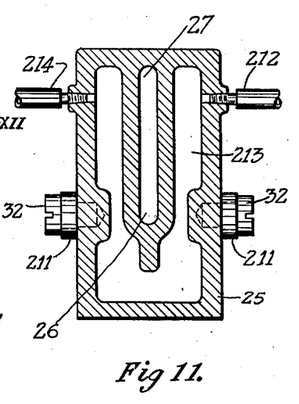
Fig. 11 is a section through the blow back slide on line XI—XI of Fig. 1.

A blow-back slide 25 (Figs. 1 and 11) bears against the bottom surface of the hanger-bracket 17 and slides thereon longitudinally of the forehearth. Motion is imparted thereto through a slide lever 29 trunnioned to said slide by screws 32 fixed into said slide through the yoked ends 211 of the slide lever, said lever being pinioned on a fulcrum pin 34 on a slide yoke 38 movable in slideways 33 at an angle to the blow-back slide 25. The slide yoke 38 has at its lower end a pin 39 to which is attached the eye-block 215 affixed to one end of a piston rod 40 having attached at its other end, a piston 46 movable in an air cylinder 45 supported in a position corresponding with the angularity of the slideways 33 by brackets 47 affixed to the frame 4. The air cylinder 45 has connected at its upper end an air line 43 and at its lower end an air line 44, said air lines communicating with an air valve 156 (Fig. 4) supported on an arm 161 extending from the bracket 115, said valve having a valve stem 162 provided at its outer end with a roller 163 held by a spring within the air cylinder 156 in contact with the face of a valve operating cam 160 affixed to the cam shaft 111. The valve 156 is also provided with air relief ports (not shown), to allow the escape of air from the advancing end of the piston and with an air supply line 157 connected to the source of compressed air supply.

The blow-back slide 25 is firmly held against the under surface of the orifice bracket 17 by the tension of a spring 37 connected at its upper end to the slide lever 29 and fixed at its lower end to the frame 4 through eye bolt 50, the arrangement being such that as slide 25 is advanced toward orifice 13, the tension on said spring increases, thereby insuring better sealing of said slide against the under surface of bracket 17. The stroke of the blow-back slide is controlled in its forward movement by a screw 35 adjustable in a lug 81 extending from the slideway 33, said screw contacting with a lug 49 on the slide yoke 38 at the end of the forward stroke. The amount of backward stroke is determined by a screw 42 adjustable in a bracket 41 affixed to the frame 4, said screw contacting with an upward projection of the slide yoke 38 at the end of the backward stroke. The blow-back slide 25 is provided with an air passage having an inlet 27 adapted to register with a supply port 30 in the hanger bracket 17, and an outlet 26 to register with the orifice 13 when the slide is in its forward position. The supply port 30 is connected with a source of air under controlled pressure. Surrounding the air passage of slide 25 is a water circulating passage 213 (see Fig. 11) having flexible hose lines connected to an inlet 212 and an outlet 214. It will be understood that the blow-back slide 25 and its operating mechanism may be omitted in the manufacture of certain kinds of ware, and under conditions which permit the flow of glass to be controlled by the plunger 11 alone.

If desired, the nose 95 of the blank mold 21 (see Fig. 10) may be provided with a series of radial vacuum relief holes 217 drilled angularly downward from said nose. Said holes are of small diameter so that the viscosity of the molten glass will prevent its entrance into the holes during the gathering operation, at which time the outlets 216 of said holes are sealed against the bearing surface of the recess 96 of the orifice supporting ring 16.

Figure 9:
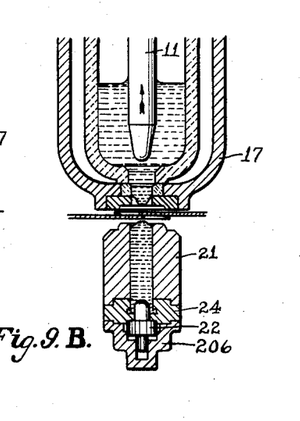

The operation is as follows:

At the beginning of the gathering cycle (see Fig. 9), the plunger 11 is in its upper position, the shear blades 94a and 94b are in their retracted station with respect to orifice 13, the blow-back slide 25 is beneath the orifice supporting ring 16 with its air port 26 in communication with said orifice, and the vacuum arm 206 is in its lowered position, all as indicated in Fig. 9.

The frame 172 (Fig. 7), preferably mounting a plurality of slide brackets 171, is intermittently rotated about shaft 183 until the axis of a blank mold 21 is in alignment with the orifice supporting ring 16, said intermittent rotation being synchronized with the revolving of cam 182 (which is continuously rotating) in such a manner that the roller 179 on the slide 178 moves in the lower horizontal portion of cam groove 181, thereby maintaining blank mold 21 and neck mold 24 in their lower horizontal plane (Fig. 9) throughout such intermittent movement. The cam shaft 111 (Figs. 4 and 5) is synchronized in uniform rotation with the shaft 194 (Fig. 7) (which drives lifting cam shaft 183 through bevel gears 193 and 192) in such a manner that as the blank mold 21 arrives at the station above described the cam 160 mounted on shaft 111, operates the plunger 162 of the air valve 156, thereby admitting compressed air through pipe 43 to the upper end of the air cylinder 45 (Fig. 1) and actuating piston 46 to retract the blow-back slide 25 away from the orifice, to the position of Fig. 1. With further continued uniform rotation of shafts 194, 183 and 111, the following subsequent actions take place:

The cam 196 (Fig. 7) opens the air valve 198, admitting air to the piston of cylinder 202 and thereby raising vacuum arm 206 into firm contact with neck mold 24. The upwardly inclined position of the cam groove 181 of cam 182 engages the roller 179 on the slide 178, thereby raising the blank mold 21 and neck mold 24 into closely spaced relation with orifice supporting ring 16. The vacuum arm 206 follows the mold upward, due to the continued pressure of air within cylinder 202. The double ended wedge 189 now engages beneath the upper roller 180 of the slide 178, so that further raising of the blank mold 21 to bring its nose 95 into tight contact with the side walls of the recess 96 of the orifice supporting ring 16, is accomplished through the compressive and upwardly thrusting action of the spring 187 against the thrust nut 188 of the rod 185 on which the wedge 189 is firmly mounted. With such upward motion of the roller 180, the lower roller 179 rises into the clearance space 208 (Fig. 14) of the cam groove 181, and blank mold 21 is held tightly against the orifice supporting ring 16 while the flat portion 220 of the double ended wedge 189 is passing beneath roller 180. As the blank mold is brought into contact with the orifice supporting ring 16, the rotation of cam shaft 111 causes the cam 150 (see Fig. 5) to operate the plunger 152 of vacuum valve 153, so that vacuum is applied to the neck mold 24 and blank mold 21 through the hose 155 and the vacuum arm 206 and simultaneously therewith also causes cam 110 affixed to said shaft to start the depression of the roller 108 (Fig. 6), thereby resulting in a corresponding downward motion of refractory plunger 11 (Fig. 2) through the lever 105, the rod 79, lever 68, carrier 61 and arm 12.

Figures 4, 5, 6:
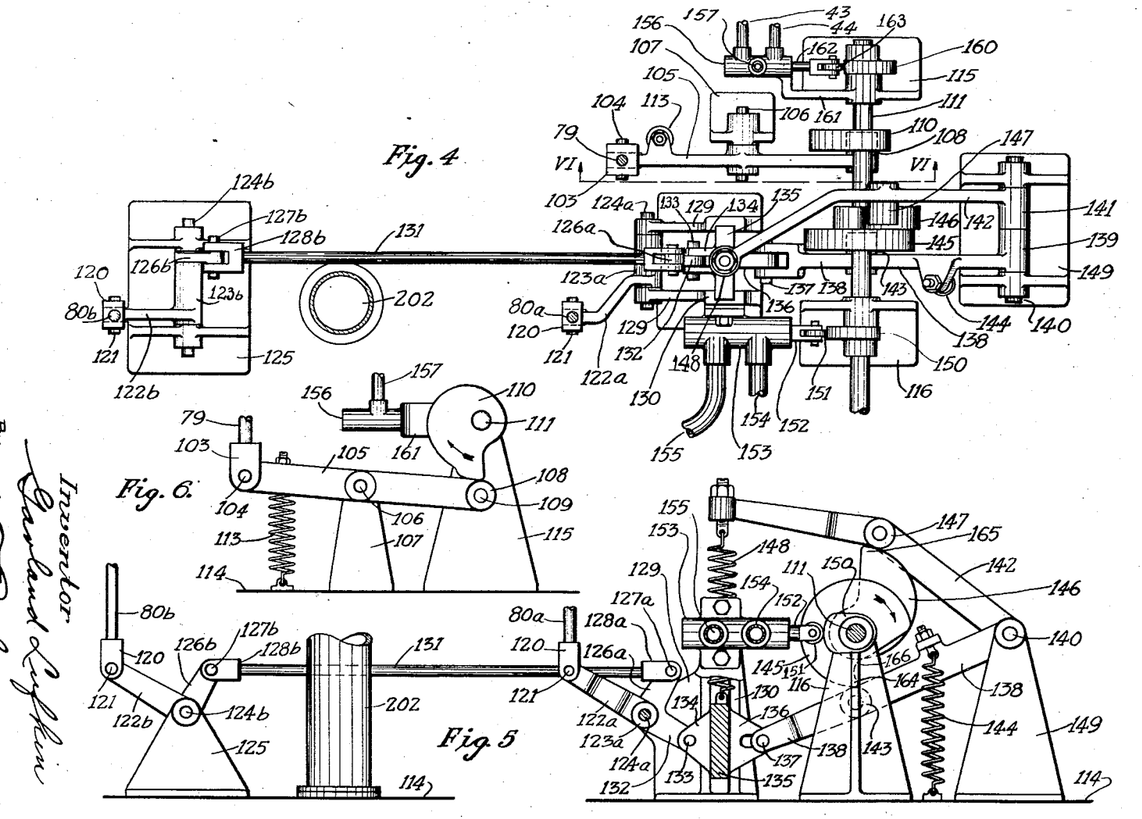
Fig. 4 is a plan view of the mechanism for operating the shears, the refractory plunger, the vacuum valve and the air valve of the blow-back-slide piston.
Fig. 5 is a side elevation of the mechanism of Fig. 4.
Fig. 6 is a section on the line VI—VI of Fig. 4.

The application of vacuum to the blank mold and neck mold assists the gravitational force upon the molten glass in rapidly filling said molds during the descent of the refractory plunger 11 to the position of Fig. 9A. At this stage, the continuing uniform rotation of the plunger operating cam 110 causes a short and rapid further downward motion of the plunger 11, due to the engagement of roller 108 by the extended portion 110a of the face of said cam, said extension being at the longest radius of the cam, as shown in Fig. 6. Such rapid downward motion of the needle serves to compact the molten glass in the blank mold 21 and neck mold 24, thereby further insuring a solid parison or blank, and also serves to form partial or complete closure, according to the shape and adjustment of plunger 11, at the opening 13 of the orifice.

The continuing rotation of the cam 182 (Fig. 7) with shaft 183 now brings the downwardly inclined surface of the double ended wedge 189 into contact with upper roller 180 of slide 178, thereby partially relieving the compression of spring 187. The upper downwardly sloping ledge of the clearance space 208 of cam groove 181 engages the lower roller 179, thereby lowering the roller to the upper horizontal sector 209 of said cam groove, so that the blank mold 21 and neck mold 24 are positively positioned in a horizontal plane while the shearing operation occurs. The vertical position of nose 95 of the blank mold 21 with respect to roller 179 is such that as said roller is engaged in the upper horizontal sector 209 of cam groove 181, said nose is spaced from the under surface of hanger bracket 17 only a sufficient distance to provide clearance for the operation of the shear blades 94a and 94b, as indicated in Fig. 9B.

The air valve 198 is held open by the cam 196 until the lowering of the blank mold 21 and neck mold 24, and the subsequent shearing operation have been completed and vacuum in the arm 206 is also maintained during these operations by the vacuum cam 150 working in conjunction with vacuum valve 153. The vacuum arm 206 is consequently in firm contact with neck mold 24 during the downward movement of the blank and neck molds, since this movement takes place against the upward pressure of air in the cylinder 202.

Figure 1:
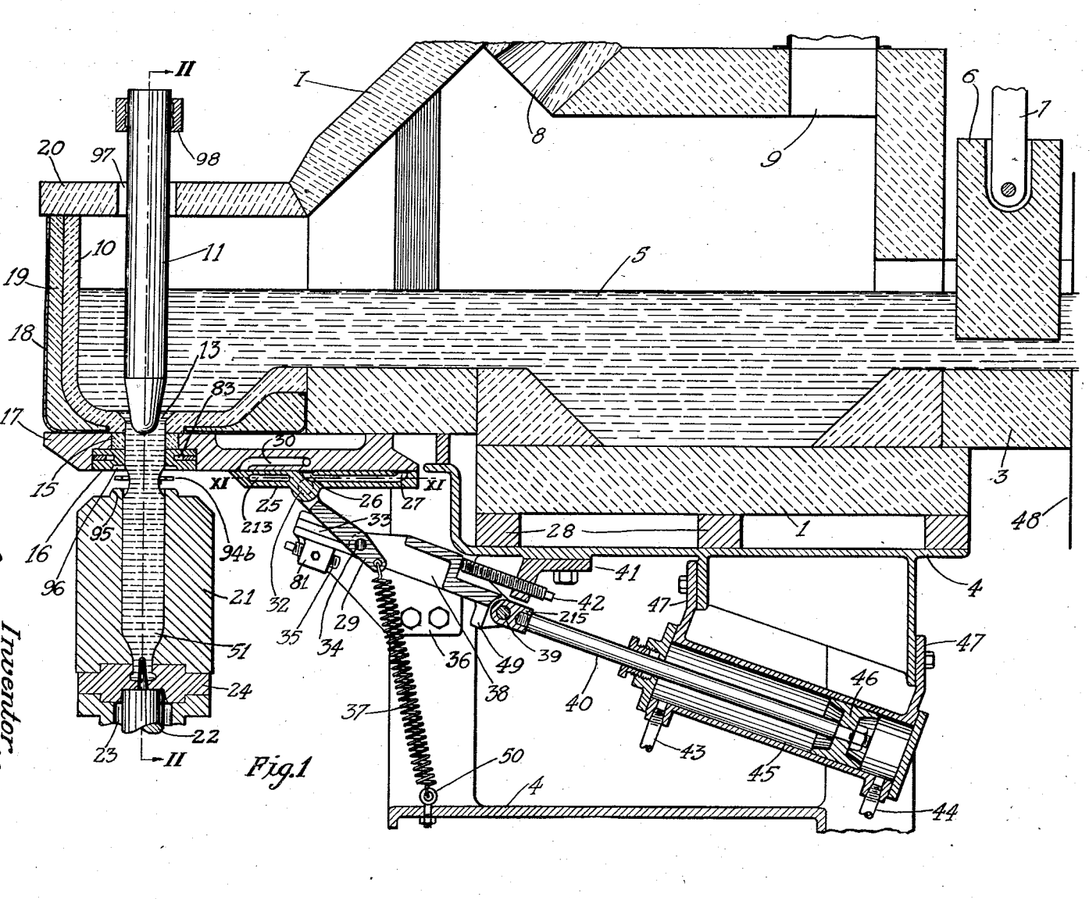
Fig. 1 is a longitudinal sectional elevation of the apparatus.

As the blank mold 21 is withdrawn from the orifice supporting ring 16, the molten glass adheres to the walls of the bore of the blank mold, as shown in Fig. 1 and Fig. 10. If vacuum relief holes 218 are provided in the nose of the blank mold, such adhesion will extend up to the plane of said holes. The molten glass intervening between the blank mold and orifice supporting ring is necked or constricted in consequence of such adhesion, thereby reducing the area of glass in the plane of the shear blades and minimizing the cutoff scar at the end of the parison. By providing the relief holes 218, the necking in is extended downward to the plane of said holes as shown in Fig. 10. In other words, the glass is tapered or necked inward and upward from the plane of the holes 218 so that the greatest constriction is at or just above the upper surface of the mold. By thus lowering the point of greatest constriction, the cutting plane can be correspondingly lowered so that after the knives operate, there is but little glass protruding above the mold. There is also room for the glass to spread and settle in the mold.

Immediately after the cam 182 has withdrawn the blank mold from the orifice by lowering roller 179 to the upper horizontal sector 209 of cam groove 181, the shear blades 94$^a$ and 94$^b$ are rapidly reciprocated across the bottom surface of hanger bracket 17, thereby severing the glass intervening between the end of the blank mold and the orifice and are withdrawn immediately thereafter in the following manner:

The point 164 (Fig. 5) of the cam 145 passes the roller 143 of the lever arm 138 connected to shear operating slide 135, thereby allowing the slide to be rapidly pulled upward by the tension of the spring 148 attached thereto, until the roller 143 is arrested in a recess 166 of the cam 145. This action gives a corresponding downward motion to the vertical rod 80$^a$ through the levers 132 and 122$^a$ connected therewith and a simultaneous downward motion to the rod 80$^b$ through the levers 132 and 126$^a$ integral therewith, connecting rod 131, levers 126$^b$ and 122$^b$. Such downward motion of rods 80$^a$ and 80$^b$ advances the shear hanger slides 53 (Fig. 2) through the levers 58, shafts 57 and levers 56, such movement of the hanger slides carrying the shear blades 94$^a$ and 94$^b$ across the under surface of the hanger bracket 17 and severing the column of molten glass.

The upward pull on the slide 135 due to spring 148 exceeds the downward pull on said slide due to spring 144 working through lever 138, so that the slide remains in an upward position until the tension is relieved from the spring 148, which occurs immediately after the upward movement of the slide when point 165 of cam 146 passes the roller 147 of the lever 142, to which the spring 148 is attached. The tension of the spring 144 then draws down the lever 138 which returns the slide to its original downward position and retracts the shear blades from the orifice.

Simultaneous with the advance of the shear blades for cutoff, the refractory plunger 11 is quickly raised by the rapid downward motion of the rod 79 actuated through lever 105 (Fig. 6) by the tension of the spring 113 thereon as the high point of the cam 110 passes the roller 108 of said lever.

Inasmuch as the molten glass in contact with the needle tends to adhere to it, the rapid withdrawal of the needle from the orifice serves to further constrict immediately previous to the shearing operation, the molten glass intervening between the blank mold and the orifice by drawing it out into a smaller diameter and to draw up into the orifice immediately following the shearing operation, the severed portion of glass protruding therefrom as shown in Fig. 9B.

Subsequent to the retraction of the shear blades from the orifice, the continuing rotation of the cam 160 with the shaft 111 allows the plunger 162 of the air valve 156 to return to its closed position under the action of the spring within the valve cylinder, thereby cutting off the air supply to pipe 43 and allowing it to flow through pipe 44 into the lower end of the air cylinder 45, thereby forcing the piston 46 forward and upward in said cylinder and thus advancing the blow-back slide 25 under the orifice 13, so that air under controlled pressure enters said orifice from the port 30 in the hanger bracket 17, through inlet 27 and outlet 26 of said slide, thereby blowing back into the spout 10 the sheared-off protrusion of glass (as indicated in Fig. 9) and allowing elimination of the cutoff scar by the heating action of the surrounding molten glass.

The vacuum cam 150 on the shaft 111 now releases the vacuum from hose 155, and cam 196 (Fig. 7) on the shaft 194 allows the air valve 198 to close, relieving the air pressure from the cylinder 202, thereby causing the descent of piston rod 204 and vacuum arm 206 by the action of gravity, to its original position (Fig. 9). This completes the gathering cycle, which may then be repeated in a like manner.

It is evident that the blank mold 21 and neck mold 24 may be filled in the manner described above, though at a less rapid rate, by dispensing with the vacuum and relying on the pushing and final compressing actions of refractory plunger 11 as it descends toward orifice 13.

After a parison has been formed in the blank and neck molds in the manner described, the molds are opened and the parison transferred by mechanism (not shown) of usual or approved construction, to a finishing mold in which it is blown to the form of a finished article.

Modifications may be resorted to within the spirit and scope of my invention.

What I claim is:

1. Means for gathering molten glass comprising a container for molten glass having an outlet orifice, a blank mold, means for holding the blank mold firmly applied to the orifice in communication therewith beneath the level of a source of molten glass, a plunger in alignment with said orifice projecting downwardly into said molten glass, means for imparting a slow initial downward motion to said plunger to assist the action of gravity in filling said mold with molten glass, and means brought into activity after the plunger has nearly completed its downward stroke and after the mold is substantially filled, for imparting a final rapid downward motion to said plunger to compact the molten glass within said mold.

2. The combination of a container for molten glass having a bottom outlet orifice, a mold open at its upper end to receive a charge of glass, means for moving the mold transversely to a position beneath and spaced from the said orifice, means for moving the mold upward into sealing contact with the orifice, means for causing glass to flow through the said orifice into the mold, means for moving the mold downward into spaced relation to the said container, means operating on the glass within the container for exerting an upward pull on the glass at the orifice and thereby causing a constriction of the glass, said constriction extending from the orifice downward into the mold, means for determining the point to which the constriction extends downward within the mold by permitting the entrance of air into said open end of the mold around the glass therein while preventing said air from going downward below said point, and means for severing the glass at the constriction.

3. The combination of a container for molten glass having a bottom outlet opening, a mold carriage rotatable about a vertical axis, a mold thereon movable by the rotation of the carriage to a position in vertical alignment with and spaced below said orifice, means for moving the mold up into sealing contact with the container, means to apply suction within the mold to cause the glass to fill the mold, means for moving the mold downward away from the said container while the suction is retained, said mold being provided with an annular series of relief openings extending from the mold cavity adjacent the upper end of the mold, said suction being applied to the mold below said relief openings, and shears operable to sever the glass between the mold and the container.

4. The combination of a mold open at one end to receive a charge of molten glass, and means for applying suction at the opposite end of the mold, said mold being provided with an annular series of air relief openings extending from the mold cavity at a plane adjacent said open end of the mold and open to atmospheric pressure.

5. The combination of a container for molten glass, a mold movable into a charging position, means for causing glass to flow from the container into the mold and fill the mold, means brought into activity after the mold is filled and acting upon the glass in the container to apply a momentary force to the glass in the filled mold for compacting the glass in the mold, and means for then severing the glass in the mold from the supply body.

6. The combination of a container for molten glass, a mold movable into a charging position, means for causing glass to flow from the container into the mold and fill the mold, means brought into activity after the mold is substantially filled for applying a momentary pressure to the glass within the mold while still connected with the supply body, and means for then severing the glass in the mold from the supply body.

7. The combination of a container for molten glass, a mold open at one end to receive a charge of glass, means including suction applied within the mold cavity for causing the glass to flow from the supply body into the mold and fill the mold, and means brought into activity after the mold is filled and while the suction is maintained and the glass in the mold is still connected with the supply body, to apply a compacting force to the glass in the mold.

8. The combination of a container for molten glass, a mold open at one end to receive a charge of glass, means including suction applied within the mold cavity for causing the glass to flow from the supply body into the mold and fill the mold, means brought into activity after the mold is substantially full and acting on the glass in the container for momentarily applying pressure on the glass within the filled mold, and means for then severing the glass in the mold from that in the container.

9. The combination of a container for molten glass having a bottom outlet opening, a mold open at its upper end to receive a charge of glass, means for bringing the mold to a charge receiving position beneath the outlet, a plunger projecting into the glass over the outlet, means for moving the plunger downward while the glass is entering the mold, and means brought into activity after the mold is about filled and after the plunger has nearly completed its downward movement for giving an accelerated final downward movement to the plunger to thereby compact the glass in the mold.

10. The combination of a mold carriage rotatable intermittently about a vertical axis, a mold thereon brought to a charge receiving station by the rotation of the mold carriage, a cam, means for rotating the cam about said axis while the mold carriage is stationary, and means actuated by the cam for lifting the mold to a charge receiving position.

11. The combination of a mold carriage intermittently rotatable about a vertical axis, a mold thereon, a cam, means for rotating the cam continuously about the said vertical axis, and mechanism actuated by the cam for moving the mold vertically on the carriage while the latter is at rest.

12. The combination of a container for molten glass having a bottom outlet, a mold carriage rotatable intermittently about a vertical axis, a mold on the carriage brought by said rotation to a charge receiving station beneath the outlet, a cam rotatable about the axis of the mold carriage, means actuated by the cam for lifting the mold vertically into sealing relation to the outlet, and means for holding the mold in such position by spring pressure during a predetermined time interval.

13. The combination of a mold carrier, a mold, a carriage on which the mold carrier is supported, means for intermittently rotating the carriage, vertical guides on the mold carriage, said carrier movable vertically on said guides, a cam rotatable about the axis of the said carriage, and means operated thereby while the carriage is stationary for periodically moving the carrier up and down on said guides.

14. The combination of a mold carrier, a mold, a carriage on which the mold carrier is supported, means for intermittently rotating the carriage and carrier, vertical guides on the mold carriage, said carrier movable vertically on said guides, a cam rotatable continuously about a vertical axis, and a cam roll carried by said carrier running on said cam, said cam shaped to periodically move the roll upward and thereby lift the mold carrier and mold while the carriage is stationary.

15. The combination of a mold carrier, a mold, a carriage on which the mold carrier is supported, vertical guides on the mold carriage, said carrier movable vertically on said guides, a cam rotatable continuously about a vertical axis, a cam roll carried by said carrier running on said cam, said cam shaped to periodically move the roll upward and thereby lift the mold carrier and mold, means forming a stop to limit the upward movement of the mold, and means for applying an upward spring pressure to said carrier while the mold is at the upward limit of its movement.

16. The method of forming a parison of plastic glass which comprises bringing a mold cavity into communication with a supply body of molten glass, causing the glass to enter the mold cavity by a differential pressure and thereby substantially fill the mold cavity, and momentarily applying an augmented pressure to a portion of the glass comprising the supply body and transmitting said augmented pressure to the glass in the mold to thereby compact the glass in the mold, and then severing the glass in the mold from the supply body.

17. The method of forming a parison of molten glass which comprises causing a downward movement of molten glass from a supply body into a mold therebeneath by a differential downward pressure on the glass above the mold and thereby substantially filling the mold, and momentarily applying an increased downward pressure on glass in the supply body at an area directly over the mold and transmitting said pressure to the glass in the mold, and then severing the glass in the mold from the supply body.

18. The combination of a container for molten glass having an outlet orifice, a blank mold, means for holding the mold in sealing contact with the container at said orifice, means for causing glass to enter and fill the mold through said orifice and for compacting the glass in the filled mold while in said sealing contact with the container, means for withdrawing the mold from the orifice, means for causing a constriction of the glass intervening between the orifice and the mold when the mold is withdrawn, means for causing said constriction to extend downward a predetermined distance into the mold cavity and for definitely limiting said distance, and means for severing the glass at the constriction.

19. The combination of a mold carriage rotatable intermittently about a vertical axis, a mold thereon brought to a charge receiving station by the rotation of the mold carriage, a cam operable while the mold carriage is at rest with the mold at said station to move the mold vertically upward into close proximity to a charge receiving position, and means comprising a separate cam then brought into operation to complete the upward movement of the mold and yieldingly hold it in said charge receiving position.

20. The combination of a container for molten glass having a bottom outlet, a mold carriage rotatable about a vertical axis, a mold thereon movable by the rotation of the carriage to a position beneath and spaced from said outlet, a cam for lifting the mold vertically into close proximity to the container at said outlet, and means separate from said cam for bringing the mold into sealing engagement with the container and holding it in such engagement with a spring pressure.

GARLAND LUFKIN.